United States Patent [19]

Share

[11] 3,903,301

[45] Sept. 2, 1975

[54] METHODS OF TREATING MUSCULAR DISORDERS

[75] Inventor: Nathan Norman Share, Cote St. Luc, Canada

[73] Assignee: Merck & Co., Inc., Rahway, N.J.

[22] Filed: Apr. 9, 1974

[21] Appl. No.: 459,747

Related U.S. Application Data

[63] Continuation-in-part of Ser. No. 336,648, Feb. 28, 1973, abandoned.

[52] U.S. Cl. ................................................. 424/321
[51] Int. Cl.² ........................................ A61K 27/00
[58] Field of Search ..................................... 424/321

[56] References Cited
UNITED STATES PATENTS
3,306,934   2/1967   Engelhardt.......................... 424/321

*Primary Examiner*—Stanley J. Friedman
*Attorney, Agent, or Firm*—James A. Arno; Harry E. Westlake, Jr.; Rudolph J. Anderson, Jr.

[57] ABSTRACT

The present invention relates to a pharmaceutical composition providing a dosage unit of from 1 to 25 mg. of 3-(N,N-dimethylsulfamoyl)-5-(3-dimethylaminopropylidene)-5H-dibenzo[a,d]cycloheptene or the corresponding 10,11-dihydro compound, and salts thereof useful as a skeletal muscle relaxant. It also relates to a method of treating muscular spasm and other similar muscular disorders associated with or caused by injury or arising spontaneously with no known cause by the administration of a pharmaceutical composition containing 3-(N,N-dimethylsulfamoyl)-5-(3-dimethylaminopropylidene)-5H-dibenzo[a,d]-cycloheptene or the corresponding 10,11-dihydro compound, or a salt thereof, as one of the active ingredients.

13 Claims, No Drawings

METHODS OF TREATING MUSCULAR DISORDERS

This application is a continuation-in-part of U.S. Pat. application Ser. No. 336,648, filed Feb. 28, 1973 (now abandoned).

The present invention relates to a pharmaceutical composition providing a dosage unit of from 1 to 25 mg. of 3-(N,N-dimethylsulfamoyl)-5-(3-dimethylaminopropylidene)-5H-dibenzo[a,d]cycloheptene or the corresponding 10,11-dihydro compound, and salts thereof, useful as a skeletal muscle relaxant. It also relates to a method of treating muscular spasm and other similar muscular disorders associated with or caused by injury or arising spontaneously with no known cause by the administration of a pharmaceutical composition containing 3-(N,N-dimethylsulfamoyl)-5-(3-dimethylaminopropylidene)-5H-dibenzo[a,d]cycloheptene or the corresponding 10,11-dihydro compound, or a salt thereof, as one of the active ingredients.

BACKGROUND

Muscle spasm or spasticity and related clinical disorders involving muscle hyperactivity or increase in muscle tone affect a large section of the population. Such clinical disorders involving muscle hyperactivity include the spasticity of cerebral origin which may arise from brain injury or tumor and disease associated with a variety of cardiovascular accidents such as stroke, thrombosis or embolus. Another related disorder which is of great importance especially in the treatment of children 6 to 14 years of age is cerebral palsy. Other clinical disorders involving muscular hyperactivity are Parkinson's disease especially characterized by muscular spasticity and muscular rigidity and muscle spasm of traumatic origin, including low-back and cervical spine syndromes, many orthopedic deformities, arthritic states, myositis, whiplash injuries, fractures, dislocations, cramps, sciatica and spinal cord injuries. At present, a variety of medicinals are used in an attempt to relieve or correct the clinical disorders involving muscle hyperactivity including muscle spasm and spasticity and the pain associated therewith. But the use of these various materials unfortunately is attended by concomitant side effects and toxicity which limit the usefulness of these medicinals. There is an unsatisfied need at the present time for a medication which has a high specific effect on muscle hyperactivity causing various clinical disorders when administered either by the oral or parenteral route and which at the same time has a minimum of side effects or contraindications.

DETAILED DESCRIPTION

It is an object of the present invention to develop a method for treating clinical disorders involving muscle hyperactivity such as muscle spasm and spasticity as well as related problems of muscle rigidity or splinting including Parkinson's disease and multiple sclerosis in human patients by the administration of a safe but effective dose of 3-(N,N-dimethylsulfamoyl)-5-(3-dimethylaminopropylidene)-5H-dibenzo[a,d]cycloheptene or the corresponding 10,11-dihydro compound of the formula:

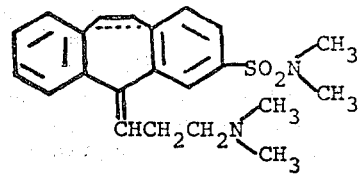

or a pharmaceutically acceptable non-toxic salt thereof, in which the dotted line represents either another carbon to carbon bond or 2 hydrogens.

It is a further object of the present invention to develop a method of effecting relaxation of skeletal muscles by the administration to the afflicted patient from about 0.05 to about 4 mg./kg. of 3-(N,N-dimethylsulfamoyl)-5-(3-dimethylaminopropylidene)-5H-dibenzo[a,d]cycloheptene or the corresponding 10,11-dihydro compound, or a pharmaceutically acceptable non-toxic acid addition salt thereof.

A still further object of the invention is to provide compositions in unit dosage from comprising from 1 to 50 mg. of 3-(N,N-dimethylsulfamoyl)-5-(3-dimethylaminopropylidene)-5H-dibenzo[a,d]cycloheptene or the corresponding 10,11-dihydro compound, or an acid addition salt thereof, useful in the treatment of muscular spasm.

It is a further object of the present invention to provide methods and compositions for the alleviation of muscle hyperactivity including muscular spasm, spasticity and rigidity without the attendant side effects, such as dryness of the mouth. These and other more specific objects will be apparent from the following description and claims.

The compositions of the present invention are preferably presented for administration in unit dosage form as tablets, pills, capsules, powders, granules, sterile parenteral solutions or suspensions and the like. For preparing solid compositions such as tablets, the principal active ingredient is mixed with a pharmaceutical carrier, i.e., conventional tableting ingredients such as corn starch, lactose, sucrose, sorbitol, talc, stearic acid, magnesium stearate, dicalcium phosphate, gums, and other pharmaceutical diluents, e.g., water, to form a solid preformulation composition containing a homogeneous mixture of 3-(N,N-dimethylsulfamoyl)-5-(3-dimethylaminopropylidene)-5H-dibenzo[a,d]cycloheptene or the corresponding 10,11-dihydro compound or a pharmaceutically acceptable non-toxic acid addition salt thereof admixed with the pharmaceutical carrier. When referring to these preformulation compositions as homogeneous, it is meant that the active ingredient, 3-(N,N-dimethylsulfamoyl)-5-(3-dimethylaminopropylidene)-5H-dibenzo[a,d]cycloheptene or the corresponding 10,11-dihydro compound, or the salt thereof, is dispersed evenly throughout the composition to that the composition may be readily subdivided into equally effective unit dosage forms such as tablets, pills, capsules and the like. This solid preformulation composition is then subdivided into unit dosage forms of the type described above containing from 1 to 25 mg. of 3-(N,N-dimethylsulfamoyl)-5-(3-dimethylaminopropylidene)-5H-dibenzo[a,d]cycloheptene or the corresponding 10,11-dihydro compound, or salt thereof, per unit dose.

In a preferred mode of preparing the unit dose compositions of my invention, the cis isomer of 3-(N,N-dimethylsulfamoyl)-5-(3-dimethylaminopropylidene)-5H-dibenzo[a,d]cycloheptene or the corresponding 10,11-dihydro compound, preferably the hydrochloride salt, is mixed with a pharmaceutical carrier in a proportion of about one part of the active ingredient per hundred parts of formulation by weight. In this manner, tablets containing between 2 and 20 mg. of the cis isomer of 3-(N,N-dimethylsulfamoyl)-5-(3-dimethylaminopropylidene)-5H-dibenzo[a,d]-cycloheptene or the corresponding 10,11-dihydro compound per tablet are prepared by mixing the appropriate amount of 3-(N,N-dimethylsulfamoyl)-5-(3-dimethylaminopropylidene)-5H-dibenzo[a,d]-cycloheptene or the corresponding 10,11-dihydro compound hydrochloride with appropriate amounts of lactose or other suitable sugar, starch (preferably corn starch), and a salt of stearic acid. The mixture is suitably granulated and compressed into tablets containing between 1 and 25 mg. of the active ingrediet per tablet. The tablets or pills of the novel composition can be coated or otherwise compounded to provide a dosage form affording the advantage of prolonged action of the 3-(N,N-dimethylsulfamoyl)-5-(3-dimethylaminopropylidene)-5H-dibenzo[a,d]-cycloheptene or corresponding 10,11-dihydro compound or salt thereof. For example, the tablet or pill can comprise an inner dosage and an outer dosage component, the latter being in the form of an envelope over the former. The two components can be separated by an enteric layer which serves to resist disintegration in the stomach and permits the inner component to pass intact into duodenum or to be delayed in release. A variety of materials can be used for such enteric layers or coatings, such materials including a number of polymeric acids or mixtures of polymeric acids or mixtures of polymeric acids with such materials as shellac, shellac and cetyl alcohol, cellulose acetate, and the like. A form which is in part enteric coated is particularly useful for the purpose of the present invention since the compositions of the present invention are characterized by their rapid onset of action when administered in conventional oral dosage form, e.g., simple compressed tablets and the like.

The liquid forms in which the novel composition of the present invention may be incorporated for administration include aqueous solutions, suitably flavored syrups, aqueous or oil suspensions, flavored emulsions with edible oils such as cottonseed oil, sesame oil, coconut oil, peanut oil and the like, as well as elixirs and similar pharmaceutical vehicles. Suitable dispersing or suspending agents for aqueous suspensions include synthetic and natural gums such as tragacanth, acacia, alginate, dextran, sodium carboxymethylcellulose, methylcellulose, polyvinyl-pyrrolidone, gelatin and the like.

The formulations of 3-(N,N-dimethylsulfamoyl)-5-(3-dimethylaminopropylidene)-5H-dibenzo[a,d]-cycloheptene or the corresponding 10,11-dihydro compound and a pharmaceutically acceptable salt are normally administered orally, parenterally or rectally. Orally, they may be administered in tablets, capsules, suspensions or syrups, the preferred dosage form being a compressed tablet containing from 1–25 mg. of the active ingredient, for example, the hydrochloride of 3-(N,N-dimethylsulfamoyl)-5-(3-dimethylaminopropylidene)-5H-dibenzo[a,d]cycloheptene, per tablet. The optimum dosage depends of course on the dosage form being used and the type and severity of the condition being treated. In any specific case, the appropriate dosage selected will further depend on factors of the patient which may influence response to the drug, for example, general health, age, weight, etc. Age in particular appears to be a definite factor in selecting the appropriate dosage. Thus, children appear to tolerate more of the drug on a mg./kg. basis than normal adults. Although the optimum quantities of 3-(N,N-dimethylsulfamoyl)-5-(3-dimethylaminopropylidene)-5H-dibenzo-[a,d]-cycloheptene or the corresponding 10,11-dihydro compound, or salt thereof, to be used in such manner depends on the particular salt employed in the particular type of muscular condition treated, oral dose levels of the preferred formulation in the range of 0.05 to 2 mg./kg. per day show excellent effectiveness in adults, especially in the range of 0.1 to 0.4 mg./kg. per day. In children, on the other hand, the dose levels employed in various conditions range from 0.05 to 5 mg. per day. The doses employed for example in the treatment of children affected with cerebral palsy are in the order of approximately 4 mg./kg. per day. Within this noted range, the dosage must, of course, be adjusted to the need of the patient taking into account the particular disease condition and other factors including general health, weight, etc. Comparative dosages are used in parenteral or rectal administration. The daily dosages are expressed as mg. of 3-(N,N-dimethylsulfamoyl)-5-(3-dimethylaminopropylidene)-5H-dibenzo[a,d]cycloheptene or corresponding 10,11-dihydro compound base per kilogram of patient body weight per day.

The compounds used as the active ingredient in the composition of the present invention are 3-(N,N-dimethylsulfamoyl)-5-(3-dimethylaminopropylidene)-5H-dibenzo[a,d]-cycloheptene or the corresponding 10,11-dihydro compound, or a pharmaceutically acceptable salt thereof. 3-(N,N-dimethylsulfamoyl)-5-(3-dimethylaminopropylidene)-5H-dibenzo[a,d]-cycloheptene is a tricyclic amine compound of the formula:

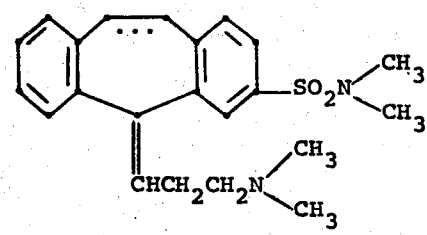

in which the dotted line represents a carbon-to-carbon bond or two hydrogens, which is described in U.S. Pat. No. 3,306,934 of Edward L. Engelhardt and Marcia E. Christy as a substance useful in tranquilizing animals or humans. This patent, in that it describes the preparation of instant compounds, pharmaceutically acceptable salt derivatives thereof, and resolution of the cis-trans geometrical isomers exhibited by the instant compounds, is incorporated herein by reference. The compound 3-(N,N-dimethylsulfamoyl)-5-(3-dimethylaminopropylidene)-5H-dibenzo[a,d]-cycloheptene, or the 10,11-dihydro compound, is most easily administered in the form of a non-toxic acid addition salt. Such salts are prepared by methods known in the art. Other salts which are prepared in accordance with similar methods known to the art are those salts the acid component of which is pharmaceutically acceptable in the intended dosages. Such salts include those prepared from 3-dimethylsulfam--5-(3-dimethylaminopropylidene)-5H-dibenzo-[a,d]cycloheptene and one of the group of acids including hydrochloric acid, hydrobromic acid, sulfuric acid, nitric acid, phosphoric acid, methane sulfonic acid, acetic acid, maleic acid, tartaric acid, lactic acid, salicylic acid and other similarly constituted acids used as the acid component of amine base acid addition salts for pharmaceutical administration.

The compositions of this invention, specifically 5-(3-dimethylaminopropylidene)-3-dimethylsulfamoyl-5H-dibenzo[a,d]cycloheptene and 5-(3-dimethylaminopropylidene)-10,11-dihydro-3-dimethylsulfamoyl-5H-dibenzo[a,d]-cycloheptene, or a pharmaceutically acceptable non-toxic acid addition salt thereof, preferably the hydrochloride admixed with a pharmaceutically acceptable non-toxic carrier, are administered to patients suffering from skeletal muscle spasm or related muscular disorders to effect relaxation of the skeletal muscle in the afflicted patient. The compositions of 5-(3-dimethylaminopropylidene)-3-dimethylsulfamoyl-5H-dibenzo[a,d]cycloheptene and 5-(3-dimethylaminopropylidene)-10,11-dihydro-3-dimethylsulfamoyl-5H-dibenzo[a,d]-cycloheptene are unusually specific in their muscle relaxant properties and the administration of such compositions in either oral or injectable form results in an extremely rapid onset of action of the medication. The administration of the compositions of my invention is also surprisingly free from any toxic reactions or side effects resulting from the medication. This is completely unexpected since the above-cited patent mentions the use of the drug as a tranquilizer, anti-depressant, or anti-histamine. Remarkably, at the dosage levels recommended for the treatment of muscular spasm, there is minimal tranquilizing effect or other noticeable behavioral effects.

The compositions of 5-(3-dimethylaminopropylidene)-3-dimethylsulfamoyl-5H-dibenzo[a,d]cycloheptene and 5-(3-dimethylaminopropylidene)-10,11-dihydro-3-dimethylsulfamoyl-5H-dibenzo[a,d]-cycloheptene are administered in unit dosages of from 1-25 mg. of the drug present as an acid addition salt, e.g., 3-dimethylsulfamoyl-5-(3-dimethylaminopropylidene-5H-dibenzo[a,d]cycloheptene hydrochloride. Thus, in one preferred mode of treatment of muscular spasm, an average adult patient is treated by the daily administration of from 1 to 4–10 mg. tablets of 3-dimethylsulfamoyl-5-(3-dimethylaminopropylidene)-5H-dibenzo[a,d]cycloheptene at equally spaced intervals. If for some reason oral administration is not recommended, the patient suffering from muscular spasm or other related disorders is treated by the injection, preferably by the intravenous route, of approximately 1 ml. of sterile aqueous solution containing from 1–20 mg., preferably about 10 mg. of a salt of 3-dimethylsulfamoyl-5-(3-dimethylaminopropylidene)-5H-dibenzo[a,d]cycloheptene, preferably the hydrochloride. If patient or physician preference dictates, other modes of administration, i.e., intramuscular injection, rectal administration and the like, may be employed. However, because of the extreme rapid onset of action in either the oral or intravenous mode of administration, there is rarely a need for other routes of administration.

The following are detailed examples showing the preparation of the pharmaceutical compositions of this invention. They are to be construed only as illustrations of said compositions and are not intended as limitations thereof.

EXAMPLE 1

A 10-Milligram Tablet of 3-Dimethylsulfamoyl-5-(3-dimethylaminopropylidene)-5H-dibenzo[a,d]cycloheptene

FORMULA

| | |
|---|---|
| 3-Dimethylsulfamoyl-5-(3-dimethyl-aminopropylidene)-5H-dibenzo[a,d]-cycloheptene hydrochloride | 10.0 g. |
| Lactose USP | 65.0 g. |
| Corn Starch USP | 20.0 g. |
| Magnesium Stearate USP | 0.5 g. |

A batch of 1,000 10-mg. tablets of 3-dimethylsulfamoyl-5-(3-dimethylaminopropylidene)-5H-dibenzo[a,d]-cycloheptene is prepared by mixing the ingredients listed above as follows.

The 3-dimethylsulfamoyl-5-(3-dimethylaminopropylidene)-5H-dibenzo[a,d]-cycloheptene hydrochloride, lactose and a portion of the corn starch are mixed and granulated with a 10% corn starch paste. The resulting granulation is sieved and blended with magnesium stearate and the remainder of the corn starch. The resulting granulation is then compressed into tablets containing 10 mg. of 3-dimethylsulfamoyl-5-(3-dimethylaminopropylidene)-5H-dibenzo[a,d]-cycloheptene hydrochloride per tablet. Corresponding tablets containing respectively 2 mg., 5 mg., and 20 mg. of 3-dimethylsulfamoyl-5-(3-dimethylaminopropylidene)-5H-dibenzo[a,d]-cycloheptene hydrochloride per tablet are prepared using the same procedure but varying the amount of 3-dimethylsulfamoyl-5-(3-dimethylaminopropylidene)-5H-dibenzo[a,d]cycloheptene hydrochloride added to the mixture in the appropriate ratio.

EXAMPLE 2

Other 10-Milligram Tablets of 3-Dimethylsulfamoyl-5-(3-Dimethylaminopropylidene)-5H-dibenzo[a,d]cycloheptene The procedure of Example 1 is repeated using the same ingredients with the exception of 3-dimethylsulfamoyl-5-(3-dimethylaminopropylidene)-5H-dibenzo[a,d]cycloheptene hydrochloride, which is replaced with an equimolar amount of the acid addition salt of 3-dimethylsulfamoyl-5-(3-dimethylaminopropylidene)-5H-dibenzo[a,d]cycloheptene and hydrobromic acid.

The procedure of Example 1 is repeated using the same ingredients with the exception of 3-dimethylsulfamoyl-5-(3-dimethylaminopropylidene)-5H-dibenzo[a,d]cycloheptene hydrochloride, which is replaced with an equimolar amount of the acid addition salt of 3-dimethylsulfamoyl-5-(3-dimethylaminopropylidene)-5H-dibenzo[a,d]cycloheptene and sulfuric acid.

The procedure of Example 1 is repeated using the same ingredients with the exception of 3-dimethylsulfamoyl-5-(3-dimethylaminopropylidene)-5H-dibenzo[a,d]cycloheptene hydrochloride, which is replaced with an equimolar amount of the acid addition salt of 3-dimethylsulfamoyl-5-(3-dimethylaminopropylidene)-5H-dibenzo[a,d]cycloheptene and nitric acid.

The procedure of Example 1 is repeated using the same ingredients with the exception of 3-dimethylsulfamoyl-5-(3-dimethylaminopropylidene)-5H-dibenzo[a,d]cycloheptene hydrochloride, which is replaced with an equimolar amount of the acid addition salt of 3-dimethylsulfamoyl-5-(3-dimethylaminopropylidene)-5H-dibenzo[a,d]cycloheptene and phosphoric acid.

The procedure of Example 1 is repeated using the same ingredients with the exception of 3-dimethylsulfamoyl-5-(3-dimethylaminopropylidene)-5H-dibenzo[a,d]-cycloheptene hydrochloride, which is replaced with an equimolar amount of the acid addition salt of 3-dimethylsulfamoyl-5-(3-dimethylaminopropylidene)-5H-dibenzo[a,d]-cycloheptene and methane sulfonic acid.

The procedure of Example 1 is repeated uing the same ingredients with the exception of 3-dimethylsulfamoyl-5-(3-dimethylaminopropylidene)-5H-dibenzo[a,d]cycloheptene hydrochloride, which is replaced with an equimolar amount of the acid addition salt of 3-dimethylsulfamoyl-5-(3-dimethylaminopropylidene)-5H-dibenzo[a,d]cycloheptene and acetic acid.

The procedure of Example 1 is repeated using the same ingredients with the exception of 3-dimethylsulfamoyl-5-(3-dimethylaminopropylidene)-5H-dibenzo[a,d]cycloheptene hydrochloride, which is replaced with an equimolar amount of the acid addition salt of 3-dimethylsulfamoyl-5-(3-dimethylaminopropylidene)-5H-dibenzo[a,d]cycloheptene and maleic acid.

The procedure of Example 1 is repeated using the same ingredients with the exception of 3-dimethylsulfamoyl-5-(3-dimethylaminopropylidene)-5H-dibenzo[a,d]cycloheptene hydrochloride, which is replaced with an equimolar amount of the acid addition salt of 3-dimethylsulfamoyl-5-(3-dimethylaminopropylidene)-5H-dibenzo[a,d]cycloheptene and tartaric acid.

The procedure of Example 1 is repeated using the same ingredients with the exception of 3-dimethylsulfamoyl-5-(3-dimethylaminopropylidene)-5H-dibenzo[a,d]cycloheptene hydrochloride, which is replaced with an equimolar amount of the acid addition salt of 3-dimethylsulfamoyl-5-(3-dimehylaminopropylidene)-5H-dibenzo[a,d]cycloheptene and lactic acid.

The procedure of Example 1 is repeated using the same ingredients with the exception of 3-dimethylsulfamoyl-5-(3-dimethylaminopropylidene-5H-dibenzo[a,d]cycloheptene hydrochloride, which is replaced with an equimolar amount of the acid addition salt of 3-dimethylsulfamoyl-5-(3-dimethylaminopropylidene)-5H-dibenzo[a,d]cycloheptene and salicylic acid.

EXAMPLE 3
A 10-Milligram Tablet of 3-Dimethylsulfamoyl-5-(3-dimethylaminopropylidene)-5H-dibenzo[a,d]cycloheptene

FORMULA

| | |
|---|---|
| 3-Dimethylsulfamoyl-5-(3-dimethylaminopropylidene)-5H-dibenzo[a,d]cycloheptene hydrochloride | 10.0 g. |
| Microcrystalline Cellulose | 65.0 g. |
| Corn Starch USP | 20.0 g. |
| Magnesium Stearate USP | 0.5 g. |

A batch of 1,000 10-mg. tablets of 3-dimethylsulfamoyl-5-(3-dimethylaminopropylidene)-5H-dibenzo[a,d]-cycloheptene is prepared by mixing the ingredients listed above as follows.

The 3-dimethylsulfamoyl-5-(3-dimethylaminopropylidene)-5H-dibenzo[a,d]cycloheptene hydrochloride, microcrystalline cellulose and a portion of the corn starch are mixed and granulated with a 10% corn starch paste. The resulting granulation is sieved and blended with magnesium stearate and the remainder of the corn starch. The resulting granulation is then compressed into tablets containing 10 mg. of 3-dimethylsulfamoyl-5-(3-dimethylaminopropylidene)-5H-dibenzo[a,d]cycloheptene hydrochloride per tablet. Corresponding tablets containing respectively 2 mg., 5 mg., and 20 mg. of 3-dimethylsulfamoyl-5-(3-dimethylaminopropylidene)-5H-dibenzo[a,d]cycloheptene hydrochloride per tablet are prepared using the same procedure but varying the amount of 3-dimethylsulfamoyl-5-(3-dimethylaminopropylidene)-5H-dibenzo[a,d]cycloheptene hydrochloride added to the mixture in the appropriate ratio.

EXAMPLE 4
Intravenous Solution of 3-Dimethylsulfamoyl-5-(3-dimethylaminopropylidene)-5H-dibenzo[a,d]cycloheptene Hydrochloride A solution containing 10 mg. of 3-dimethylsulfamoyl-5-(3-dimethylaminopropylidene)-5H-dibenzo[a,d]cycloheptene hydrochloride per milliliter of injectable solution is prepared in the following manner. A mixture of 10 mg. of 3-dimethylsulfamoyl-5-(3-dimethylaminopropylidene)-5H-dibenzo[a,d]cycloheptene hydrochloride and 50 mg. of Mannitol NF is dissolved in sufficient water for injection to make 1 ml. of solution. The solution is prepared and stored in such a manner that it is suitably protected from the deleterious effects of the atmosphere. One method by which this can be accomplished is by preparation and storage of the solution in an atmosphere of nitrogen. The resulting solution is sterilized by autoclaving. The above example is given for a unit dose of 3-dimethylsulfamoyl-5-(3-dimethylaminopropylidene)-5H-dibenzo[a,d]-cycloheptene but the same procedure may be appropriately employed to make larger amounts of solution by utilizing the appropriate ratio of 3-dimethylsulfamoyl-5-(3-dimethylaminopropylidene)-5H-dibenzo[a,d]cycloheptene hydrochloride, Mannitol NF and water for injection.

Other intravenous solutions having different concentrations of 3-dimethylsulfamoyl-5-(3-dimethylaminopropylidene)-5H-dibenzo[a,d]cycloheptene are prepared by utilizing 2, 5, 20 or 40 mg. of 3-dimethylsulfamoyl-5-(3-dimethylaminopropylidene)-5H-dibenzo[a,d]cycloheptene hydrochloride per ml. of solution.

EXAMPLE 5

A Film-Coated Tablet of 3-Dimethylsulfamoyl-5-(3-dimethylaminopropylidene)-5H-dibenzo[a,d]cycloheptene hydrochloride

FORMULA

| | |
|---|---|
| 3-Dimethylsulfamoyl-5-(3-dimethyl-aminopropylidene)-5H-dibenzo-[a,d]cycloheptene hydrochloride | 10 mg. |
| Lactose | 107 mg. |
| Corn Starch USP | 32 mg. |
| Magnesium Stearate USP | 1 mg. |

Appropriate multiples of the above amounts are used as required.

The 3-dimethylsulfamoyl-5-(3-dimethylaminopropylidene)-5H-dibenzo[a,d]cycloheptene hydrochloride, lactose, and a portion of the corn starch are mixed and granulated with a 10% corn starch paste. The resulting granulation is sieved, dried and blended with the remainder of the corn starch and the magnesium stearate. The resulting granulation is then compressed into tablets containing 10 mg. of 3-dimethylsulfamoyl-5-(3-dimethylaminopropylidene)-5H-dibenzo[a,d]cycloheptene hydrochloride per tablet.

FILM COATING

| | Ingredients |
|---|---|
| 1.28 mg. | Hydroxypropylmethylcellulose |
| 1.28 mg. | Hydroxypropylcellulose |
| 0.35 mg. | Titanium Dioxide |
| 0.09 mg. | Yellow Light Lemon Dye |
| 43.00 ml. | Ethanol Anhydrous |
| 43.00 ml. | Chloroform NF |

The amounts of ingredients are appropriately multiplied for the number of tablets required to be coated. Dissolve with agitation the hydroxypropylmethylcellulose and the anhydrous ethanol and add with mixing the hydroxypropylcellulose, titanium dioxide and the yellow light lemon dye and chloroform. When the mixture is homogeneous, it is homogenized and used to film coat the appropriate number of tablets.

Similar tablets of 2.5, 5 and 25 mg. are prepared using minor variations in the formulations as follows:

| | 2.5 mg. | 5 mg. | 25.0 mg. |
|---|---|---|---|
| 3-Dimethylsulfamoyl-5-(3-dimethylaminopropylidene)-5H-dibenzo[a,d]cyclo-heptene hydrochloride | 2.5 mg. | 5.0 mg. | 25.0 mg. |
| Lactose | 56.1 mg. | 72.0 mg. | 210.0 mg. |
| Corn Starch USP | 16.0 mg. | 23.0 mg. | 69.0 mg. |
| Magnesium Stearate | 0.4 mg. | 0.5 mg. | 1.8 mg. |

What is claimed is:

1. A method for treating patients afflicted with disorders involving muscle hyperactivity which comprises administering to said patient a therapeutically effective and safe quantity of a compound having the formula:

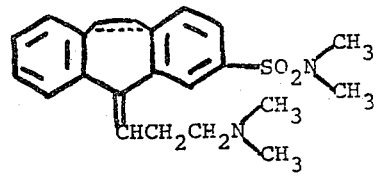

or a pharmaceutically acceptable non-toxic acid addition salt thereof, in which the dotted line represents either 2 hydrogens or a carbon-to-carbon bond.

2. A method according to claim 1 wherein the unit dosage of said compound is from 1 to 50 mg.

3. A method according to claim 1 in which the said compound is administered orally.

4. A method according to claim 3 wherein the unit dosage of said compound is between 1 and 50 mg.

5. A method according to claim 1 in which the said compound is administered parenterally.

6. A method according to claim 5 wherein the unit dosage of said compound is between 1 and 50 mg.

7. A method according to claim 1 wherein the said compound is administered in the form of the hydrochloride salt.

8. A method according to claim 3 wherein the said compound is administered in the form of the hydrochloride salt.

9. A method according to claim 5 wherein the said compound is administered in the form of the hydrochloride.

10. A method for treating patients afflicted with disorders involving muscle hyperactivity selected from the group consisting of muscle spasm, muscle spasticity, muscle rigidity, or muscle splinting which comprises administering to said patient a therapeutically effective and safe quantity of a compound having the formula:

wherein the dotted line indicates 2 hydrogens or a carbon-to-carbon bond; or a pharmaceutically acceptable nontoxic acid addition salt thereof, in an amount between about 0.05 and about 4.0 mg./kg. of body weight/day of said compound without attendant toxicity or side effects such as dryness of the mouth.

11. A method according to claim 10 wherein the unit dosage of said compound is from 1–50 mg.

12. A method according to claim 11 in which said compound is administered orally.

13. A method according to claim 11 in which said compound is administered parenterally.

* * * * *